United States Patent
Fujita (10) Patent No.: US 11,338,590 B2
(45) Date of Patent: May 24, 2022

(54) RECORDING CONDITION DETERMINING METHOD AND RECORDING DEVICE

(71) Applicant: SEIKO EPSON CORPORATION, Tokyo (JP)

(72) Inventor: Toru Fujita, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/002,851

(22) Filed: Aug. 26, 2020

(65) Prior Publication Data

US 2021/0060970 A1     Mar. 4, 2021

(30) Foreign Application Priority Data

Aug. 28, 2019   (JP) .............................. JP2019-155525

(51) Int. Cl.
    *B41J 2/21*     (2006.01)

(52) U.S. Cl.
    CPC .................. *B41J 2/2135* (2013.01)

(58) Field of Classification Search
    CPC ...... B41J 29/393; B41J 2/2132; B41J 2/2135; B41J 29/38; B41J 2/04505; B41J 11/46; B41J 2029/3935; B41J 2/21
    See application file for complete search history.

(56) References Cited

U.S. PATENT DOCUMENTS

| | | | |
|---|---|---|---|
| 5,984,454 A | 11/1999 | Takahashi et al. | |
| 2007/0121130 A1 | 5/2007 | Yoshida | |
| 2010/0182367 A1 | 7/2010 | Takagi et al. | |
| 2019/0001709 A1 | 1/2019 | Yoda | |

FOREIGN PATENT DOCUMENTS

| | | |
|---|---|---|
| JP | H05-318773 A | 12/1993 |
| JP | 2013-144415 A | 7/2013 |
| WO | 2005/042256 A1 | 5/2005 |

*Primary Examiner* — Jannelle M Lebron
(74) *Attorney, Agent, or Firm* — Global IP Counselors, LLP (57) ABSTRACT

A recording condition determining method is executed by a recording device performing recording by a main scanning and a sub scanning. The method includes a patch recording step of recording patches onto a recording medium by the overlap-processing in which the main scanning is performed on a partial region of the recording medium in an overlapping manner a plurality of times, the patch recording step including recording the patches at a plurality of different positions in a main scanning direction by a plurality of types of the overlap-processing under respectively different recording conditions. The method further includes a selection accepting step of accepting selection of a patch from among a plurality of the recorded patches, and a determination step of determining, as the recording condition of the overlap-processing of an actual recording, the recording condition of the overlap-processing associated with the patch selected in the selection accepting step.

7 Claims, 8 Drawing Sheets

| 0 | 1 | 0 | 1 | 0 | 1 | 0 | 1 |
|---|---|---|---|---|---|---|---|
| 1 | 0 | 1 | 0 | 1 | 0 | 1 | 0 |
| 0 | 1 | 0 | 1 | 0 | 1 | 0 | 1 |

| 1 | 1 | 0 | 1 | 0 | 0 | 1 | 1 |
|---|---|---|---|---|---|---|---|
| 1 | 0 | 0 | 0 | 1 | 0 | 1 | 0 |
| 0 | 1 | 0 | 1 | 1 | 1 | 0 | 0 |

| 0 | 0 | 0 | 1 | 0 | 0 | 0 | 1 |
|---|---|---|---|---|---|---|---|
| 1 | 0 | 1 | 0 | 1 | 0 | 1 | 0 |
| 0 | 1 | 1 | 1 | 0 | 1 | 1 | 1 |

| 0 | 1 | 0 | 1 | 1 | 1 | 0 | 1 |
|---|---|---|---|---|---|---|---|
| 1 | 0 | 1 | 0 | 1 | 1 | 1 | 0 |
| 0 | 1 | 1 | 1 | 0 | 1 | 0 | 1 |

FIG. 8

RECORDING CONDITION DETERMINING METHOD AND RECORDING DEVICE

The present application is based on, and claims priority from JP Application Serial Number 2019-155525, filed Aug. 28, 2019, the disclosure of which is hereby incorporated by reference herein in its entirety.

BACKGROUND

1. Technical Field

The present disclosure relates to a recording condition determining method by a recording device, and a recording device.

2. Related Art

An inkjet printer is known that forms an image on a recording medium by ejecting a liquid onto the recording medium. Further, an inkjet printer has been disclosed that has a configuration in which bands, which are images formed onto a recording medium by moving a head in a movement direction intersecting a transport direction of the recording medium, are partially overlapped with each other at a boundary between the bands (see JP-A-2013-144415). The process of recording the bands so that the bands are partially overlapped with each other is also referred to as overlap-processing. By performing the overlap-processing, it is possible to prevent a white stripe from being formed at the boundary along the movement direction of the head.

When there is a difference in image quality, such as in density, on the recording medium between a region recorded by the overlap-processing and a region recorded without applying the overlap-processing, the difference in the image quality between those regions is visually recognized as an unevenness in the density, a misalignment of patterns, and the like within the recording image. Thus, it is necessary to employ the overlap-processing appropriate for making such a difference in the image quality unnoticeable. However, it is not easy for a user to select recording conditions for the appropriate overlap-processing that suppresses the difference in the image quality.

SUMMARY

A recording condition determining method is executed by a recording device performing recording onto a recording medium by a main scanning, in which while moving a recording head provided with a plurality of nozzles in a main scanning direction, dots of a liquid are ejected from a plurality of nozzles onto the recording medium, and a sub scanning, in which the recording medium is transported in a sub scanning direction intersecting the main scanning direction. The method includes a patch recording step of recording patches onto the recording medium by the overlap-processing in which the main scanning is performed on a partial region of the recording medium in an overlapping manner a plurality of times, the patch recording step including recording the patches at a plurality of different positions in the main scanning direction by a plurality of types of overlap-processing under respectively different recording conditions. The method further includes a selection accepting step of accepting selection of a patch from among a plurality of the recorded patches, and a determination step of determining, as the recording condition of the overlap-processing of an actual recording, the recording condition of the overlap-processing associated with the patch selected in the selection accepting step.

DESCRIPTION OF EXEMPLARY EMBODIMENTS

An exemplary embodiment of the present disclosure will be described below with reference to the accompanying drawings. Each of the drawings is merely illustrative for describing the exemplary embodiment. Since each of the drawings is illustrative, ratios may not be accurate or aligned with each other, or some portions may be omitted.

1. General Description of Device

Figure 1:
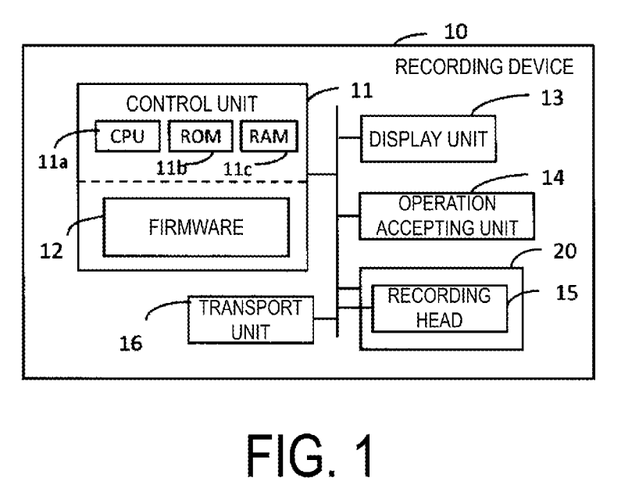
FIG. 1 is a block diagram illustrating a device configuration in a simplified manner.

FIG. 1 illustrates a configuration of a recording device 10 according to the present exemplary embodiment in a simplified manner. The recording device 10 may be described as a liquid ejecting device, a printing apparatus, a printer, or the like. The recording device 10 performs a "recording condition determining method". The recording device 10 is provided with a control unit 11, a display unit 13, an operation accepting unit 14, a recording head 15, a transport unit 16, a carriage 20, and the like. The control unit 11 is configured to include one or a plurality of ICs, another non-volatile memory, and the like. The IC includes a CPU 11a as a processor, a ROM 11b, a RAM 11c, and the like.

In the control unit 11, the processor, namely, the CPU 11a, executes arithmetic processing according to a program stored in the ROM 11b, the other memory, or the like, while using the RAM 11c or the like as a working area, in order to control each unit of the recording device 10. For example, the control unit 11 executes processing according to firmware 12, which is a type of the program. Note that the processor is not limited to the single CPU, and may be configured to perform the processing using a plurality of the CPUs or a hardware circuit, such as an application specific integrated circuit (ASIC), or may be configured to perform the processing using the CPU in conjunction with the hardware circuit.

The display unit 13 is a unit for displaying visual information, and is configured, for example, by a liquid crystal display, an organic EL display, or the like. The display unit 13 may be configured to include a display and a drive circuit for driving the display. The operation accepting unit 14 is a unit for accepting an operation by a user, and is realized by, for example, a physical button, a touch panel, a keyboard, a mouse, or the like. Of course, the touch panel may be realized as a function of the display unit 13. The display unit 13 and the operation accepting unit 14 can be referred to as an operating panel of the recording device 10. Further, the display unit 13 or the operation accepting unit 14 may be a part of the recording device 10, or may be an external peripheral device coupled to the recording device 10.

The transport unit 16 is a mechanism for transporting the recording medium. As is known, the transport unit 16 includes a roller for transporting the recording medium from upstream to downstream in a transport direction, a motor for rotating the roller, and the like. As the recording medium, a paper sheet, fabric, or other material is used. The recording device 10 that uses the fabric as the recording medium can be referred to as a textile printer.

Figure 2:
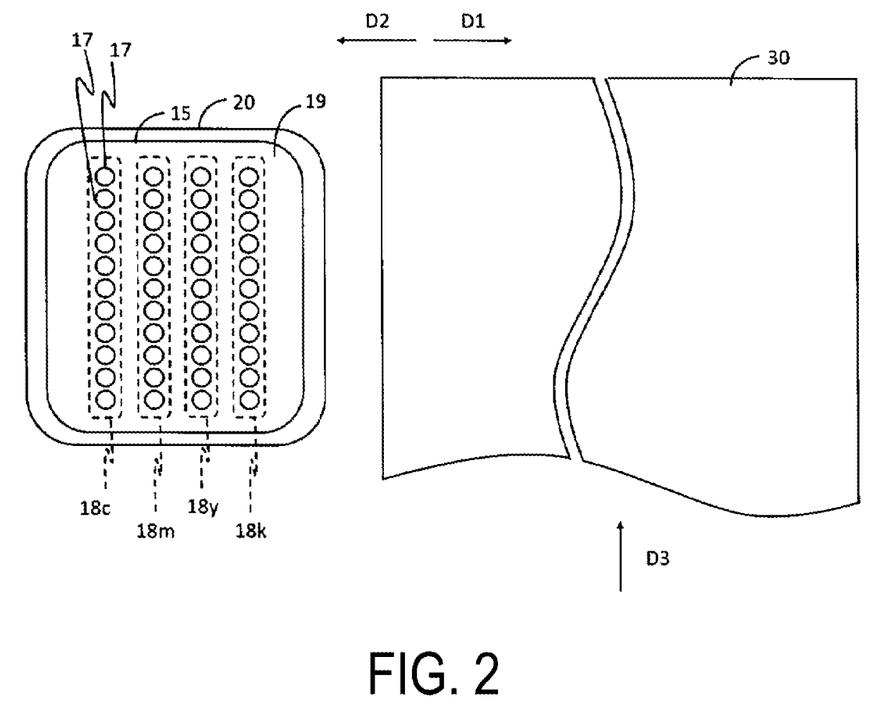
FIG. 2 is a diagram illustrating a relationship between a recording head including nozzle rows and a recording medium.

The recording head 15 ejects a liquid using an inkjet method to perform recording. As illustrated in FIG. 2, the recording head 15 includes a plurality of nozzles 17 capable of ejecting the liquid, and ejects the liquid onto a recording medium 30 transported by the transport unit 16 from each of the nozzles 17. The liquid refers to a liquid in general that can be used for the recording on the recording medium 30. The liquid will be referred to as ink below. Droplets of the ink ejected by the nozzles 17 will be referred to as dots. Note that, in the following description, the expression "dots" will be used as appropriate, even when describing image processing performed by the control unit 11 before the dots are ejected by the nozzles 17. By controlling application of a drive voltage to a drive element (not illustrated) provided in each of the nozzles 17 in accordance with dot data, the control unit 11 causes the nozzle 17 to eject or not to eject the dots.

FIG. 2 illustrates the recording head 15 including a plurality of nozzle rows. In addition, FIG. 2 illustrates a relationship between the recording head 15 and the recording medium 30 in a simplified manner. The recording head 15 may be described as a liquid ejecting head, a printing head, a print head, or the like. The recording head 15 is mounted on the carriage 20 that is movable in a predetermined direction D1 and a direction D2, which is the opposite direction to the direction D1, and moves together with the carriage 20. In other words, the control unit 11 moves the recording head 15 in the direction D1 and the direction D2 by controlling the movement of the carriage 20.

One of the directions D1 and D2 may be referred to as a positive direction, a forward direction, or the like of a main scanning, and the other of the directions D1 and D2 may be referred to as a negative direction, a return direction, or the like of the main scanning. The directions D1 and D2 are also collectively referred to as a main scanning direction. The transport unit 16 transports the recording medium 30 in a direction D3 intersecting the directions D1 and D2. The direction D3 is also referred to as a sub scanning direction, or the transport direction. Although the above-mentioned "intersecting" means being orthogonal, it does not only mean being strictly orthogonal, and the meaning of "intersecting" may also include a degree of error that occurs due to mounting accuracy of actual parts, and the like.

A reference numeral 19 denotes a nozzle surface 19 in which the nozzles 17 of the recording head 15 are open. FIG. 2 illustrates an arrangement example of the plurality of nozzle rows in the nozzle surface 19. In a configuration in which the ink of each color is supplied from a liquid holding unit (not illustrated), which is referred to as an ink cartridge, an ink tank, or the like installed in the recording device 10, the recording head 15 is provided with the nozzle row for each of the ink colors. The nozzle row is configured by the plurality of nozzles 17 that have a constant nozzle pitch, which is an interval between the nozzles 17 along the direction D3, and that eject the same color ink. The recording head 15 ejects the ink of a plurality of colors such as cyan (C), magenta (M), yellow (Y), and black (K).

In an example illustrated in FIG. 2, the recording head 15 is provided with a nozzle row 18c configured by the plurality of nozzles 17 that eject ink C, a nozzle row 18m configured by the plurality of nozzles 17 that eject ink M, a nozzle row 18y configured by the plurality of nozzles 17 that eject ink Y, and a nozzle row 18k configured by the plurality of nozzles 17 that eject ink K. Further, in the recording head 15, the plurality of nozzle rows 18c, 18m, 18y, and 18k are aligned along the directions D1 and D2, and are disposed at the same position in the direction D3. In the example illustrated in FIG. 2, although a longitudinal direction of each of the plurality of nozzle rows 18c, 18m, 18y, and 18k is parallel to the direction D3, the longitudinal direction of the nozzle rows may be inclined with respect to the direction D3. The longitudinal direction of the nozzle rows is also referred to as a nozzle row direction. The number of nozzle rows provided in the recording head 15 for each of the ink colors need not necessarily be one, as illustrated in FIG. 2, and two or more of the nozzle rows may be provided for one color. The color of the ink ejected by the recording head 15 is not limited to CMYK.

The recording device 10 realizes the recording on the recording medium 30 by alternately repeating the "main scanning" in which the dots are ejected onto the recording medium 30 from the nozzles 17 while moving the recording head 15 in the main scanning direction, and a "sub scanning" in which the recording medium 30 is transported in the sub scanning direction intersecting the main scanning direction. The main scanning is also referred to as a pass.

The configuration described above may be realized not only by a single independent device, but may also be realized by an information processing device and a printer that are communicably coupled to each other. Examples of the information processing device include a personal computer, a smartphone, a tablet terminal, a mobile phone, a server, or a device having a similar level of processing capability as those devices mentioned above. In other words, the recording device 10 may be realized by the information processing device, which serves as a recording control device including the control unit 11 and the like, and a printer including the recording head 15, the carriage 20, the transport unit 16, and the like.

2. Test Recording

Figure 3:
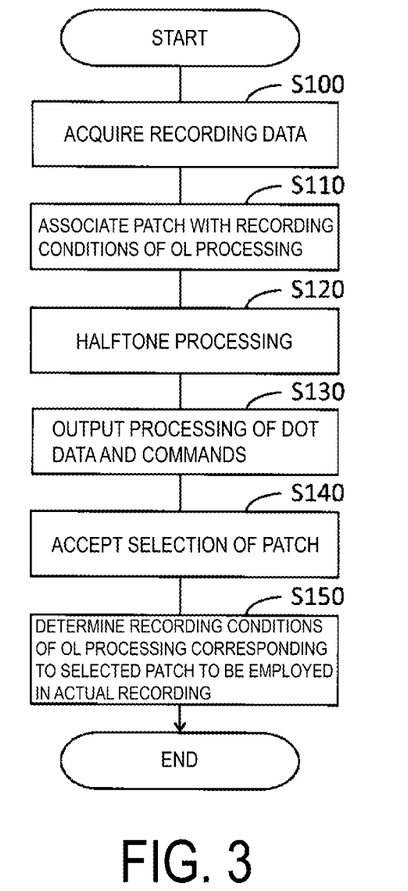
FIG. 3 is a flowchart illustrating a recording condition determining method.

FIG. 3 illustrates, using a flowchart, a record condition determining method, which is performed by the control unit 11 in accordance with the firmware 12. The flowchart illustrated in FIG. 3 is started when the user instructs the recording device 10, via the operation accepting unit 14, to perform "test recording". In the flowchart illustrated in FIG. 3, the processing from steps S100 to S130 corresponds to the test recording. The test recording is recording processing that is performed prior to "actual recording", which is a recording job for recording a recording image arbitrarily specified by the user on the recording medium 30 as an image to be recorded, and is recording processing that is necessary for determining optimal overlap-processing to be employed in the actual recording. The overlap-processing is processing in which the main scanning is performed a plurality of times in an overlapping manner on a partial region of the recording medium 30. Hereinafter, overlap will be abbreviated as "OL".

At step S100, the control unit 11 acquires recording data, which is image data representing a test image used in the test recording. The recording data is, for example, RGB data in a bitmap format in which each pixel has a gradation value for each of RGB (red, green, and blue). Alternatively, the recording data is CMYK data in a bitmap format in which each pixel has a gradation value for each of CMYK. The gradation values are expressed, for example, using 256 gradations, namely, using values from 0 to 255. The recording data is stored in advance in a storage medium, such as a memory provided inside or outside the recording device 10 so as to be accessible by the recording device 10, and the control unit 11 acquires the recording data from a storage destination of the recording data.

The test image is, for example, a pattern image specially prepared for the test recording, which is prepared in advance as an image suitable for evaluating a plurality of patches to be recorded by a plurality of types of the OL processing having respectively different recording conditions.

Alternatively, the test image may be the recording image that is represented by the recording data specified for the actual recording. In the following description, it is assumed that the recording data for the actual recording has been specified as the test image prior to step S100, by an operation of the operation accepting unit 14 by the user. Then, at step S100, the control unit 11 acquires the recording data specified for the actual recording as the recording data for the test recording.

At step S110, the control unit 11 associates the plurality of patches in the test image with the recording conditions of the OL processing. The patch is a part of an image region configuring the test image, and is an image region recorded by the OL processing.

Figure 4:
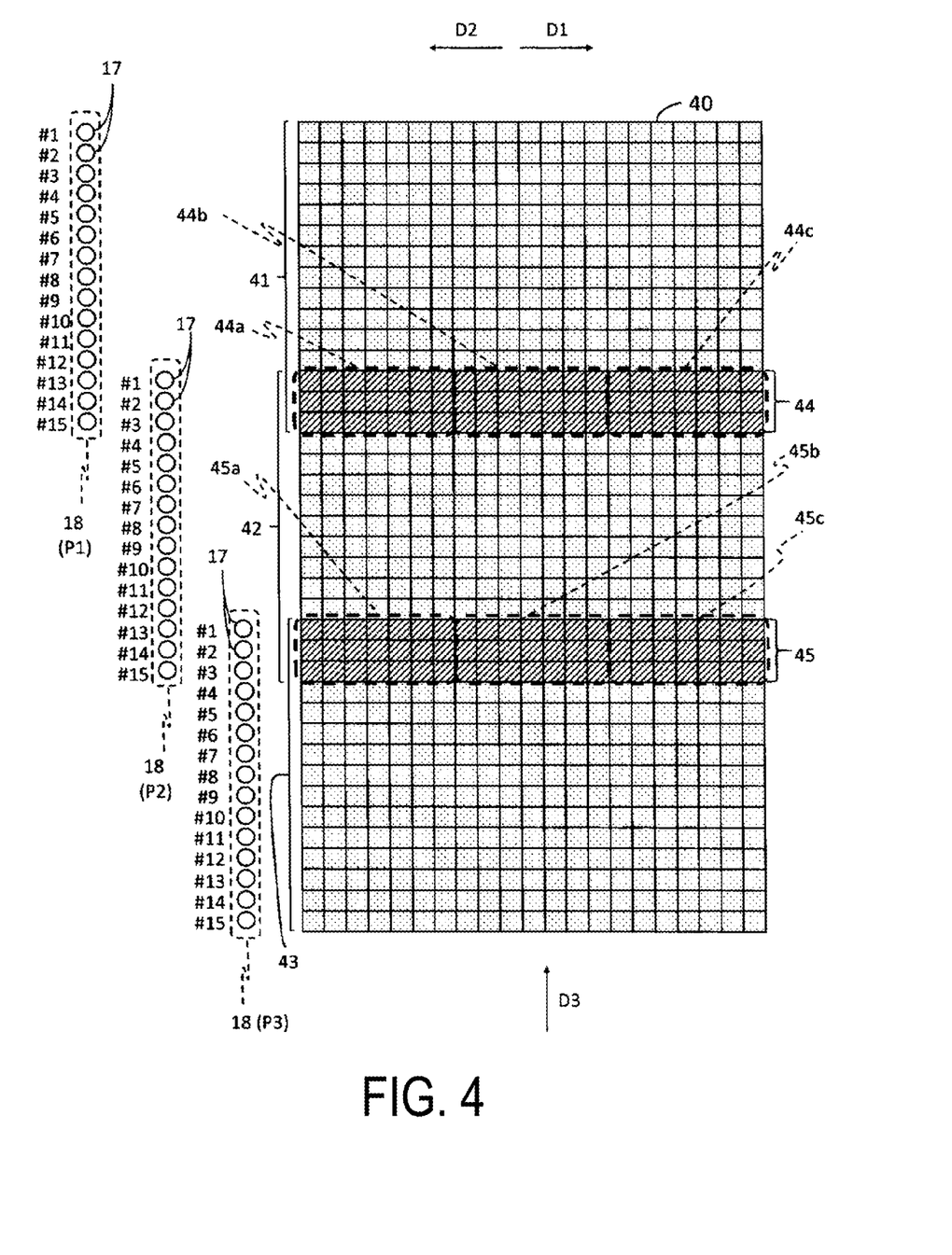
FIG. 4 is an explanatory diagram illustrating recording processing including OL processing.

FIG. 4 is an explanatory diagram illustrating recording processing including the OL processing performed by the recording device 10. A reference numeral 40 denotes the recording data acquired at step S100. Each of individual rectangles configuring the recording data 40 represents each of the pixels. In FIG. 4, correspondence relationships between the recording data 40 and the directions D1, D2, and D3 are also illustrated.

In FIG. 4, by illustrating one of the nozzle rows 18 to the left of the recording data 40, correspondence relationships between each of the pixels configuring the recording data 40 and each of the nozzles 17 configuring the nozzle row 18 are also illustrated. The nozzle row 18 may be understood to be any one of the nozzle rows 18c, 18m, 18y, and 18k, or to collectively represent the nozzle rows 18c, 18m, 18y, and 18k. In FIG. 4, for ease of description, nozzle numbers #1, #2, #3 . . . #15 are sequentially assigned to each of the nozzles 17 configuring the nozzle row 18 from downstream to upstream in the transport direction D3. Of course, the number 15 of nozzles 17 configuring the nozzle row 18 is merely an example.

A reference sign P1, which is indicated in parentheses along with the reference numeral "18" of the nozzle row 18, denotes a first main scanning P1 performed for recording the recording data 40. Similarly, a reference sign P2 denotes a second main scanning P2 performed for recording the recording data 40, and a reference sign P3 denotes a third main scanning P3 performed for recording the recording data 40. In other words, by illustrating the nozzle row 18 at a plurality of locations while shifting the nozzle row 18 along the direction D3, FIG. 4 illustrates a state in which the main scanning is performed a plurality of times to record the recording data 40.

Of course, the recording head 15 including the nozzle row 18 does not actually move in the direction D3, but by the transport unit 16 transporting the recording medium 30 in the direction D3 by a predetermined distance during an interval between the main scanning and the next main scanning, relative positional relationships between the nozzle row 18 and the recording data 40 during each of the main scannings P1, P2, and P3 illustrated in FIG. 4 are realized. According to an example illustrated in FIG. 4, each of the main scannings P1, P2, and P3 is shifted with respect to another along the direction D3 by a distance that is 12 times the nozzle pitch. Thus, in the example illustrated in FIG. 4, the recording medium 30 is transported by the single sub scanning between the main scanning and the next main scanning by the distance that is 12 times the nozzle pitch. According to such a sub scanning, a part of the region of the recording medium 30 recorded by the three nozzles 17 having the nozzle numbers #13 to #15 in the main scanning P1 is recorded by the three nozzles 17 having the nozzle numbers #1 to #3 in the main scanning P2. Similarly, a part of the region of the recording medium 30 recorded by the three nozzles 17 having the nozzle numbers #13 to #15 in the main scanning P2 is recorded by the three nozzles 17 having the nozzle numbers #1 to #3 in the main scanning P3.

A region of the recording data 40 recorded by the main scanning P1 is referred to as a first band 41. Similarly, of the recording data 40, a region recorded by the main scanning P2 is referred to as a second band 42, and a region recorded by the main scanning P3 is referred to as a third band 43. Then, a region in which the first band 41 and the second band 42 overlap with other is referred to as a first OL region 44, and a region in which the second band 42 and the third band 43 overlap with each other is referred to as a second OL region 45. As can be understood from FIG. 4, the first OL region 44 is an image recorded by each of the nozzles 17 having the nozzle numbers #13 to #15 in the main scanning P1 and each of the nozzles 17 having the nozzle numbers #1 to #3 in the main scanning P2. The second OL region 45 is an image recorded by each of the nozzles 17 having the nozzle numbers #13 to #15 in the main scanning P2 and each of the nozzles 17 having the nozzle numbers #1 to #3 in the main scanning P3.

Of each of the bands recorded by each of the main scannings, a region to which the OL processing is not applied is referred to as a non-OL region. In FIG. 4, for ease of understanding the distinction between the regions, the non-OL regions of the recording data 40 are decorated with fine black spots, and the OL regions to which the OL processing is applied, such as the first OL region 44 and the second OL region 45, are decorated with diagonal lines. These decorations are not included in the content of the test image represented by the recording data 40. Of course, the configuration in which the three nozzles 17 respectively arranged on both end portions of the nozzle row 18 in the direction D3 are used for the OL processing is merely an example.

Of the recording data 40, each of pixel rows configuring the non-OL region is recorded by one of the nozzles 17 in a single main scanning. The pixel row is a region in which the pixels are continuously aligned in parallel to the directions D1 and D2, and is also referred to as a raster line. Of the recording data 40, each of the raster lines configuring the OL region is recorded by two of the nozzles 17 in total, with the one raster line being separately recorded by two of the main scannings. For example, each of the pixels of the raster line located furthermost downstream in the transport direction D3 in the first OL region 44 is allocated to and recorded by the nozzle 17 having the nozzle number #13 in the main scanning P1, and the nozzle 17 having the nozzle number #1 in the main scanning P2. Although it is of course conceivable to perform the OL processing in which the one raster line is recorded by separately performing the main scanning three or more times, the present exemplary embodiment will be continued to be described below assuming that the one raster line is recorded by separately performing the main scanning twice.

At step S110, based on the transport distance by the single sub scanning and the number of nozzles 17 configuring the nozzle row 18, as illustrated in the example of FIG. 4, the control unit 11 identifies the OL regions in the recording data 40. Further, the control unit 11 divides the identified OL regions into a plurality of small regions along the directions D1 and D2, and forms each of the divided small regions as the patch. In the example illustrated in FIG. 4, by dividing the first OL region 44 into three substantially equal portions along the directions D1 and D2, the control unit 11 identifies a first patch 44a, a second patch 44b, and a third patch 44c. Similarly, by dividing the second region 45 into three substantially equal portions along the directions D1 and D2, the control unit 11 identifies a fourth patch 45a, a fifth patch 45b, and a sixth patch 45c. Of course, the dividing into the three equal portions is merely an example.

The control unit 11 associates each of the patches identified in this manner with the different recording conditions of the OL processing, in a one-to-one manner. Specific examples of the recording conditions will be described in first to fourth examples to be described below.

At step S120, the control unit 11 performs halftone processing on the recording data. Specific techniques for the halftone processing are not particularly limited, and a dither method, an error diffusion method, or the like may be employed, for example. By the halftone processing, the gradation values for each of the CMYK included in each of the pixels of the recording data are converted into information defining ejection of the dots (dot-on) or non-ejection of the dots (dot off) for each of the ink colors that can be ejected by the recording head 15. The recording data on which the halftone processing has been performed is referred to as dot data. If the recording data acquired at step S100 is data, such as RGB data, using a different color system or format from the CMYK data, the control unit 11 may perform color conversion processing or format conversion processing to the recording data as necessary to convert the data into the CMYK data, and then perform the halftone processing on the data.

As described above, the dot data is data defining the dot-on or dot-off for each of the pixels and for each of the ink colors. However, the dot data may be data defining the dot-off, or the dot-on in one of sizes among a plurality of dot sizes. Each of the nozzles 17 is capable of ejecting three types of the dots having relatively different sizes per droplet, for example. Of these three types of the dots, dots with the smallest size are referred to as small dots, dots one size up from the small dots are referred to as medium dots, and dots with the largest size are referred to as large dots. In such a situation, the dot data may be data defining one of dot-off, small dot-on, medium dot-on, or large dot-on for each of the pixels and for each of the ink colors.

Depending on results of the association between the patches and the recording conditions of the OL processing at step S110, the control unit 11 changes the halftone processing for each of the patches at step S120. An aspect in which the halftone processing is changed for each of the patches will be described below in detail.

At step S130, the control unit 11 sequentially outputs, to the recording head 15, the dot data converted from the recording data at step S120, while grouping the dot data in units corresponding to each of the main scannings. Further, together with the dot data, the control unit 11 outputs various types of commands required to control the main scanning and the sub scanning, to the recording head 15, the transport unit 16, and a drive unit that moves the carriage 20. The commands include, for example, a command issuing an instruction to the transport unit 16 regarding the transport distance and a transport speed of the recording medium 30 by the single sub scanning, a command to control the movement of the carriage 20, a command issuing an instruction to the transport unit 16 regarding the recording medium 30 to be used, a command issuing an instruction to the recording head 15 regarding the drive voltage applied to the drive element in each of the nozzles 17, and the like.

In the output processing of the dot data, of the dot data, the control unit 11 outputs all the pixels in the non-OL region in the same band while assigning them to the same main scanning. For example, the pixels in the non-OL region in the first band 41 are output with all the pixels being assigned to the main scanning P1. On the other hand, of the dot data, the control unit 11 allocates the pixels in the OL region to the two main scannings that record this OL region. For example, the dot data of the first OL region 44 is output while some of the pixels of each of the raster lines are allocated to the main scanning P1, and the remaining pixels of each of the raster lines are output while being allocated to the main scanning P2.

Depending on the results of the association between the patches and the recording conditions of the OL processing at step S110, the control unit 11 varies, for each of the patches, the manner in which the dot data is allocated to each of the main scannings at step S130. Processing for varying, for each of the patches, the manner in which the dot data is allocated to each of the main scannings will be described below in detail.

As a result of the output processing of the dot data and the commands at step S130, the main scanning and the sub scanning are repeatedly performed, and the test image represented by the recording data acquired at step S100 is recorded on the recording medium 30 prescribed by the command, based on the dot data. In other words, the recording described with reference to FIG. 4 is actually performed. Of course, of the dot data, the OL regions are recorded by the OL processing. Such test recording is the process of recording the patches on the recording medium 30 by performing the OL processing, and includes a patch recording step in which the patches are recorded at a plurality of positions that are different in the main scanning direction, by the plurality of types of the OL processing having the respectively different recording conditions.

The transport unit 16 transports the recording medium 30 that is prescribed by the command from upstream of a transport path. It is assumed that a type of the recording medium 30 for the actual recording has been specified by the operation of the operation accepting unit 14 by the user prior to step S100. Then, at step S130, the control unit 11 outputs, as a type of the command, a command prescribing the specified type of the recording medium 30. As a result, the recording medium 30 of the same type as the recording medium 30 specified by the user to be used for the actual recording is used for the test recording.

3. First Example

The recording conditions of the OL processing can be caused to be different by varying a mask that determines the allocation of the dots for recording the patch to a plurality of the main scannings. Such a mask is referred to as a dot allocation mask.

FIGS. 5A, 5B, 5C, and 5D illustrate dot allocation masks 50A, 50B, 50C, and 50D, respectively. According to examples in the drawings, each of the dot allocation masks 50A, 50B, 50C, and 50D is a mask in which pixels each storing a value of "0" or "1" are arranged vertically and horizontally. In the output processing of the dot data at step S130, the control unit 11 superimposes the dot allocation mask on the patch in the dot data. When the dot allocation mask 50 is superimposed on the patch in the dot data, the pixels of the dot allocation mask and the pixels of the patch overlap with each other while having a one-to-one relationship. Of the pixels in the patch, the control unit 11 allocates the pixels located at positions overlapping with "0" in the dot allocation mask to a preceding main scanning, and allocates the pixels located at positions overlapping with "1" in the dot allocation mask to a subsequent main scanning.

The preceding main scanning is the main scanning that is performed first among the two main scannings for recording the OL region, and the subsequent main scanning is the main scanning that is performed subsequently among the two main scannings for recording the OL region. Focusing on the first OL region 44, of the main scanning P1 and the main scanning P2 for recording the first OL region 44, the main scanning P1 corresponds to the preceding main scanning, and the main scanning P2 corresponds to the subsequent main scanning. Focusing on the second OL region 45, of the main scanning P2 and the main scanning P3 for recording the second OL region 45, the main scanning P2 corresponds to the preceding main scanning, and the main scanning P3 corresponds to the subsequent main scanning.

Figure 5A:
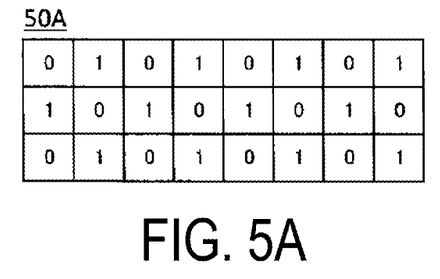
FIGS. 5A, 5B, 5C, and 5D are diagrams respectively illustrating different examples of a dot allocation mask.
Figure 5B:
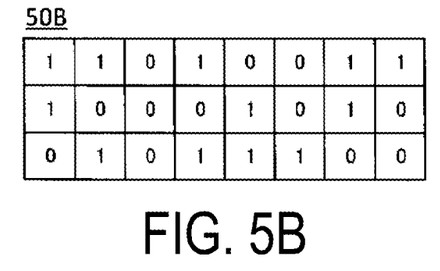

The dot allocation masks 50A, 50B, 50C, and 50D differ from one another in the arrangement of "0" and "1". In the dot allocation mask 50A, "0" and "1" are alternately aligned vertically and horizontally, and the manner in which the pixels are allocated to the preceding main scanning and the subsequent main scanning is regular. In the dot allocation mask 50B, "0" and "1" are randomly arranged, and the manner in which the pixels are allocated to the preceding main scanning and the subsequent main scanning is irregular.

Figure 5C:
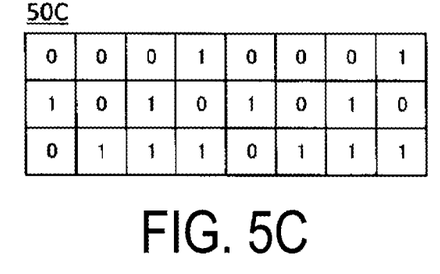

In the dot allocation mask 50C, a ratio of "0" in the pixel row is higher the further downstream the pixel row is located in the transport direction D3, and conversely, a ratio of "1" in the pixel row is higher the further upstream the pixel row is located in the transfer direction D3. According to characteristics of the dot allocation mask 50C, of the pixels in the patch, the pixels located closer to the non-OL region of the band recorded by the preceding main scanning are more likely to be allocated to the preceding main scanning, and the pixels located closer to the non-OL region of the band recorded by the subsequent main scanning are more likely to be allocated to the subsequent main scanning. The ratio of "0" and "1" in each of the dot allocation masks 50A, 50B, and 50C is 50% to 50%, and the pixels configuring the patch are allocated to the preceding main scanning and the subsequent main scanning in the same ratio.

Figure 5D:
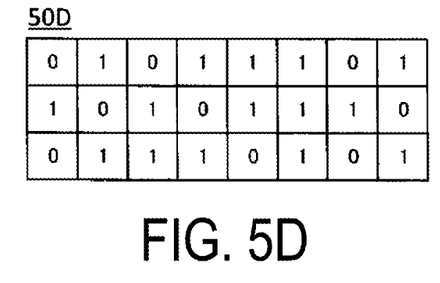

In the dot allocation mask 50D, the ratios of "0" and "1" in the mask are not equal and are set to be approximately 40% and approximately 60%, respectively. In other words, according to characteristics of the dot allocation mask 50D, the number of pixels allocated to the subsequent main scanning is greater than the number of pixels allocated to the preceding main scanning. The dot allocation mask is not limited to the dot allocation masks 50A, 50B, 50C, and 50D illustrated in the drawings, and in the test recording, various types of the dot allocation mask having mutually different arrangements and ratios of "0" and "1" can be used.

At step S110, the control unit 11 associates the different dot allocation masks with the patches, respectively. Then, at step S130, the control unit 11 applies the dot allocation mask, which has been associated with each of the patches at step S110, to each of the patches, and allocates the pixels in the patch to the preceding main scanning and the subsequent main scanning. Accordingly, with reference to FIG. 4, the pixels in the first patch 44a, the second patch 44b, and the third patch 44c, which are aligned along the directions D1 and D2, are allocated to the preceding main scanning and the subsequent main scanning in a different manner from one another, and then, the patches are recorded on the recording medium 30 by the main scanning P1 and the main scanning P2. Further, the pixels in the fourth patch 45a, the fifth patch 45b, and the sixth patch 45c, which are aligned along the directions D1 and D2, are also allocated to the preceding main scanning and the subsequent main scanning in a different manner from one another, and the patches are recorded on the recording medium 30 by the main scanning P2 and the main scanning P3.

4. Second Example

The recording conditions of the OL processing can be caused to be different by varying a size of the dots and/or an ejection order of a plurality of different sizes of the dots for recording the patch.

Figure 6A:
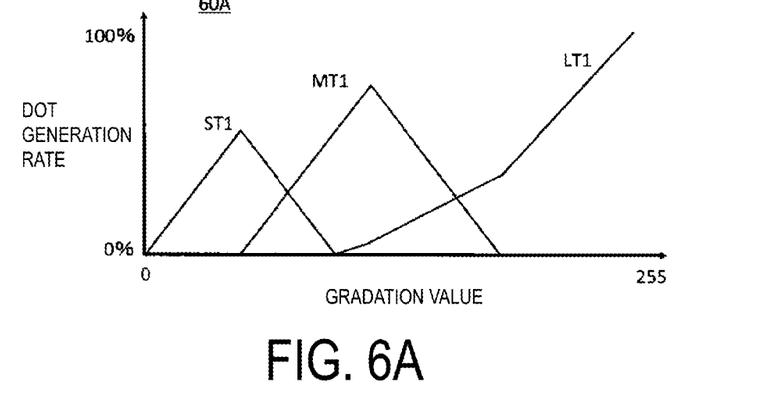
FIGS. 6A, 6B, and 6C are diagrams respectively illustrating different examples of a dot size table.
Figure 6B:
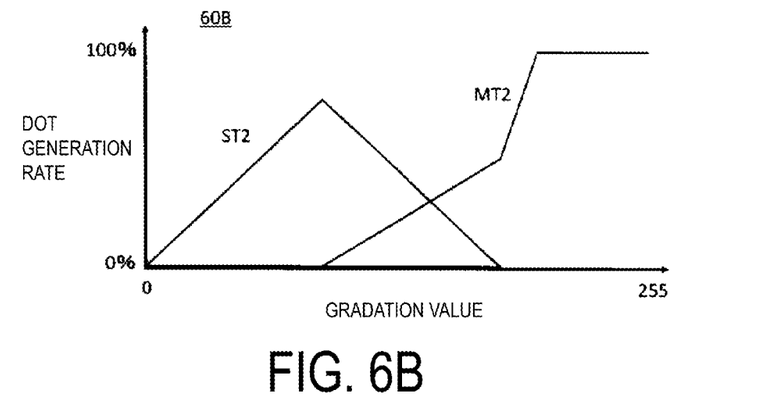
Figure 6C:
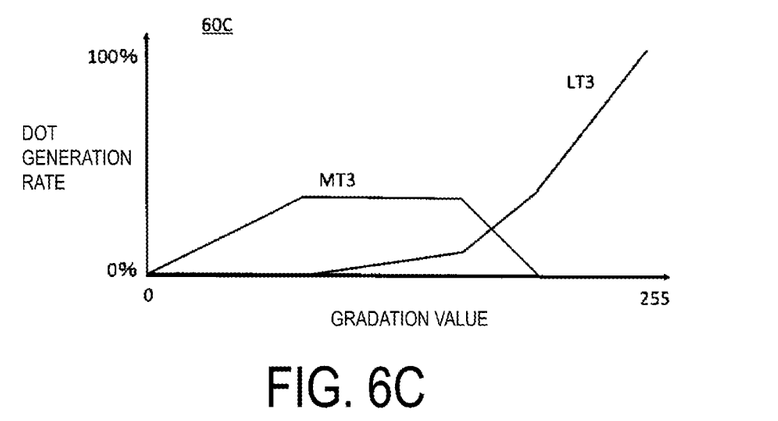

FIGS. 6A, 6B, and 6C illustrate dot size tables 60A, 60B, and 60C, respectively. The dot size table is used for the halftone processing at step S120. The dot size table is a table defining a corresponding relationship between an input gradation value (0 to 255) indicated by the horizontal axis and a dot generation rate (0 to 100%) indicated by the vertical axis, and includes some or all of a small dot table defining the dot generation rate of small dots, a medium dot table defining the dot generation rate of medium dots, and a large dot table defining the dot generation rate of large dots. At step S120, the control unit 11 inputs CMYK gradation values included in the pixels configuring the recording data into the dot size table, and reads the dot generation rate of the small dots, the dot generation rate of the medium dots, and the dot generation rate of the large dots corresponding to the input gradation values.

Then, the control unit 11 determines one of dot-off, small dot-on, medium dot-on, and large dot-on by comparing the dot generation rate of the small dots, the dot generation rate of the medium dots, and the dot generation rate of the large dots corresponding to the input gradation values, with predetermined threshold values, respectively. The control unit 11 completes the halftone processing for the recording data by performing such processing with respect to all the CMYK gradation values of all of the pixels of the recording data.

Characteristics of the dot size tables 60A, 60B, and 60C are different from one another. The dot size table 60A includes a small dot table ST1, a medium dot table MT1, and a large dot table LT1. Thus, according to the dot size table 60A, the dot generation rate of the small dots, the dot generation rate of the medium dots, and the dot generation rate of the large dots can be obtained, and as a result of the halftone processing of the recording data, the dot data representing the test image can be generated using all the dots including the small dots, the medium dots, and the large dots.

The dot size table 60B includes a small dot table ST2 and a medium dot table MT2, but does not include a large dot table. Thus, according to the dot size table 60B, the dot generation rate of the small dots and the dot generation rate of the medium dots can be obtained, but the dot generation rate of the large dots cannot be obtained. Therefore, as a result of the halftone processing of the recording data, the dot data representing the test image can be generated using the small dots and the medium dots.

The dot size table 60C includes a medium dot table MT3 and a large dot table LT3, but does not include a small dot table. Thus, according to the dot size table 60C, the dot generation rate of the medium dots and the dot generation rate of the large dots can be obtained, but the dot generation rate of the small dots cannot be obtained. Therefore, as a result of the halftone processing of the recording data, the dot data representing the test image can be generated using the medium dots and the large dots.

In the test recording, the dot size table applied to the pixels in the OL regions of the recording data for the halftone processing is not limited to the dot size tables 60A, 60B, and 60C illustrated in the drawings, and tables having various characteristics can be used. At step S110, the control unit 11 associates the different dot size tables with the patches, respectively. Then, at step S120, the control unit 11 performs the halftone processing on the pixels in each of the patches, using the dot size table associated with each of the patches at step S110.

Accordingly, with reference to FIG. 4, the dot sizes of each of the pixels in the first patch 44a, the second patch 44b, and the third patch 44c, which are aligned along the directions D1 and D2, are determined based on the dot size tables that are different from one another, and then, those patches are recorded on the recording medium 30 by the main scanning P1 and the main scanning P2. Further, the dot sizes of each of the pixels in the fourth patch 45a, the fifth patch 45b, and the sixth patch 45c, which are aligned along the directions D1 and D2, are also determined based on the dot size tables that are different from one another, and then, those patches are recorded on the recording medium 30 by the main scanning P2 and the main scanning P3. In other words, the OL processing is performed in which combinations of the dot sizes are different in each of the patches. Of course, the halftone processing is also performed on the non-OL regions of the recording data. A predetermined dot size table applied to the pixels in the non-OL regions of the recording data for the halftone processing is prescribed commonly for the test recording and the actual recording.

Alternatively, at step S110, the control unit 11 may associate different "ejection order policies" with the patches, respectively. The ejection order policy is a specification of the ejection order of the plurality of types of the dots having the different sizes in the OL processing. For example, the following ejection order policies are conceivable.

First ejection order policy: Eject the small dots and the medium dots in the preceding main scanning, and eject the large dots in the subsequent main scanning.

Second ejection order policy: Eject the small dots in the preceding main scanning, and eject the medium dots and the large dots in the subsequent main scanning.

Third ejection order policy: Eject the large dots and the medium dots in the preceding main scanning, and eject the small dots in the subsequent main scanning.

Fourth ejection order policy: Eject the large dots in the preceding main scanning, and eject the small dots and the medium dots in the subsequent main scanning.

Then, at step S130, for each of the patches, the control unit 11 allocates the dots of each of the prescribed sizes in the patch to the preceding main scanning and the subsequent main scanning, based on the ejection order policy associated with each of the patches at step S110. Accordingly, with reference to FIG. 4, the dots of each of the sizes in the first patch 44a, the second patch 44b, and the third patch 44c, which are aligned along the directions D1 and D2, are allocated to the preceding main scanning and the subsequent main scanning based on the ejection order policies that are different from one another, and then, those patches are recorded on the recording medium 30 by the main scanning P1 and the main scanning P2. Further, the dots of each of the sizes in the fourth patch 45a, the fifth patch 45b, and the sixth patch 45c, which are aligned along the directions D1 and D2, are allocated to the preceding main scanning and the subsequent main scanning based on the ejection order policies that are different from one another, and then, those patches are recorded on the recording medium 30 by the main scanning P2 and the main scanning P3. Note that when the dot allocation is performed for the patch using some form of the ejection order policy at step S130, the dot allocation mask described in the first example is not necessary.

In such a second example, the control unit 11 may associate the dot size table and the ejection order policy with each of the patches at step S110. For example, it is assumed that the control unit 11 associates the dot size table 60A and the first ejection order policy with the first patch 44a, and associates the dot size table 60B and the second ejection order policy with the second patch 44b. In this case, through steps S120 and S130, the first patch 44a is recorded on the recording medium 30 by the small dots and the medium dots ejected by the preceding main scanning (the main scanning P1), and the large dots ejected by the subsequent main scanning (the main scanning P2), and the second patch 44b is recorded on the recording medium 30 by the small dots ejected by the preceding main scanning (the main scanning P1) and the medium dots ejected by the subsequent main scanning (the main scanning P2).

5. Third Example

The recording conditions of the OL processing can be caused to be different by varying the drive voltage for ejecting the dots from the nozzle 17.

Although not illustrated in the drawings, the recording head 15 includes a drive circuit that generates the drive voltage and supplies the drive voltage to the drive element provided in each of the nozzles 17. The drive element is, for example, a piezoelectric element. During the main scanning, the drive voltage is repeatedly supplied to the drive element provided in each of the nozzles 17 every unit of time corresponding to a recording time for one pixel.

Figure 7:
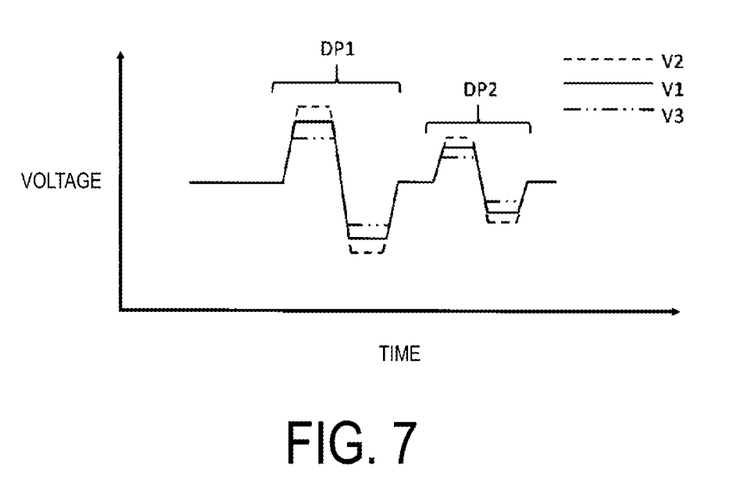
FIG. 7 is a diagram illustrating waveforms of drive voltages.

In FIG. 7, a drive voltage V1 is indicated by a solid line. In an example illustrated in FIG. 7, the drive voltage V1 has a waveform that includes a first drive pulse DP1 and a second drive pulse DP2. The amplitude of the first drive pulse DP1 is greater than the amplitude of the second drive pulse DP2. When dot data for one pixel is conveyed to one of the nozzles 17 at a timing during the main scanning, the application of the drive voltage to the drive element is controlled in accordance with the dot data for the one pixel. For example, when the dot data indicates the large dot-on, both the first drive pulse DP1 and the second drive pulse DP2 are applied to the drive element, and as a result, the large dot is ejected from the nozzle 17 corresponding to this drive element. Further, when the dot data indicates the medium dot-on, the first drive pulse DP1, of the first drive pulse DP1 and the second drive pulse DP2, is applied to the drive element, and the medium dot is ejected from the nozzle 17 corresponding to this drive element. Further, when the dot data indicates the small dot-on, the second drive pulse DP2, of the first drive pulse DP1 and the second drive pulse DP2, is applied to the drive element, and the small dot is ejected from the nozzle 17 corresponding to this drive element. Furthermore, when the dot data indicates the dot-off, neither the first drive pulse DP1 nor the second drive pulse DP2 is applied to the drive element, and none of the dots is ejected from the nozzle 17 corresponding to this drive element.

In addition, in FIG. 7, a drive voltage V2 is indicated by a dashed line, and a drive voltage V3 is indicated by a two-dot chain line. The drive voltages V2 and V3 each also include the first drive pulse DP1 and the second drive pulse DP2, in a similar manner as the drive voltage V1. The amplitudes of the first drive pulse DP1 and the second drive pulse DP2 of the drive voltage V2 are greater than those of the drive voltage V1. On the other hand, the amplitudes of the first drive pulse DP1 and the second drive pulse DP2 of the drive voltage V3 are smaller than those of the drive voltage V1. Differences between the drive voltages V1, V2, and V3 result in differences in the dot size to be ejected. In other words, the dot ejected by the drive voltage V1 is smaller than the dot ejected by the drive voltage V2, and is larger than the dot ejected by the drive voltage V3. Therefore, in the third example, the sizes of the large dot, the medium dot, and the small dot change respectively, due to the differences in the drive voltage.

At step S110, the control unit 11 associates different "combinations of the drive voltages" with the patches, respectively. The combination of the drive voltages is a combination of the drive voltages used for the preceding main scanning and the subsequent main scanning in the OL processing. For example, the following combinations of the drive voltages are conceivable.

First combination: Use the drive voltage V1 for the preceding main scanning, and use the drive voltage V1 for the subsequent main scanning.

Second combination: Use the drive voltage V2 for the preceding main scanning, and use the drive voltage V3 for the subsequent main scanning.

Third combination: Use the drive voltage V3 for the preceding main scanning, and use the drive voltage V2 for the subsequent main scanning.

Fourth combination: Use the drive voltage V1 for the preceding main scanning, and use the drive voltage V2 for the subsequent main scanning.

Fifth combination: Use the drive voltage V1 for the preceding main scanning, and use the drive voltage V3 for the subsequent main scanning.

Then, at step S130, the control unit 11 outputs setting information indicating the combination of the drive voltages associated with each of the patches at step S110, as a type of the above-described commands. During each of the main scannings, the drive circuit of the recording head 15 that has received this command changes the drive voltages for each of the patches in accordance with the setting information, but only for the drive elements corresponding to the nozzles 17 used for recording the OL region.

For example, at step S110, it is assumed that the second combination is associated with the first patch 44a as the combination of the drive voltages, and the third combination is associated with the second patch 44b as the combination of the drive voltages. In this case, the drive circuit that has received the above-described command from the control unit 11 repeatedly supplies the drive voltage V2 to each of the drive elements corresponding to each of the nozzles 17 having the nozzle numbers #13 to #15 used for recording the OL region 44 during the main scanning P1, which is a period for recording the first patch 44a. Further, the drive circuit repeatedly supplies the drive voltage V3 to each of the drive elements corresponding to each of the nozzles 17 having the nozzle numbers #13 to #15 during the main scanning P1, which is a period for recording the second patch 44b. Furthermore, the drive circuit repeatedly supplies the drive voltage V3 to each of the drive elements corresponding to each of the nozzles 17 having the nozzle numbers #1 to 3 used for recording the OL region 44 during the main scanning P2, which is the period for recording the first patch 44a, and repeatedly supplies the drive voltage V2 to each of the drive elements corresponding to each of the nozzles 17 having the nozzle number #1 to #3 during the main scanning P2, which is the period for recording the second patch 44b.

In other words, the plurality of patches, such as the first patch 44a and the second patch 44b aligned along the directions D1 and D2, are recorded on the recording medium 30 using the respective drive voltages of the preceding main scanning and the subsequent main scanning corresponding to the different combination of the drive voltages for each of the patches.

Note that the drive circuit supplies a predetermined drive voltage prescribed commonly for the test recording and the actual recording, to each of the drive elements corresponding to each of the nozzles 17 used for recording the non-OL region.

6. Fourth Example

As a matter of course, combinations of the first to third examples are included in the present exemplary embodiment.

For example, the control unit 11 may associate combinations of the dot size table and the dot allocation mask that are combinations at least partly different from one another, with the respective patches at step S110, and then may perform steps S120 and S130. Further, the control unit 11 may associate combinations of the dot size table, the dot allocation mask, and the drive voltage that are combinations at least partly different from one another, with the respective patches at step S110, and then may perform steps S120 and S130. Further, the control unit 11 may associate combinations of the dot size table, the ejection order policy, and the drive voltage that are combinations at least partly different from one another, with the respective patches at step S110, and then may perform steps S120 and S130.

7. Selection of Patch and Determination of Recording Conditions

The flowchart illustrated in FIG. 3 will be further described below.

The control unit 11 accepts a patch selection from among the plurality of recorded patches (step S140). Step S140 corresponds to a selection accepting step.

Figure 8:
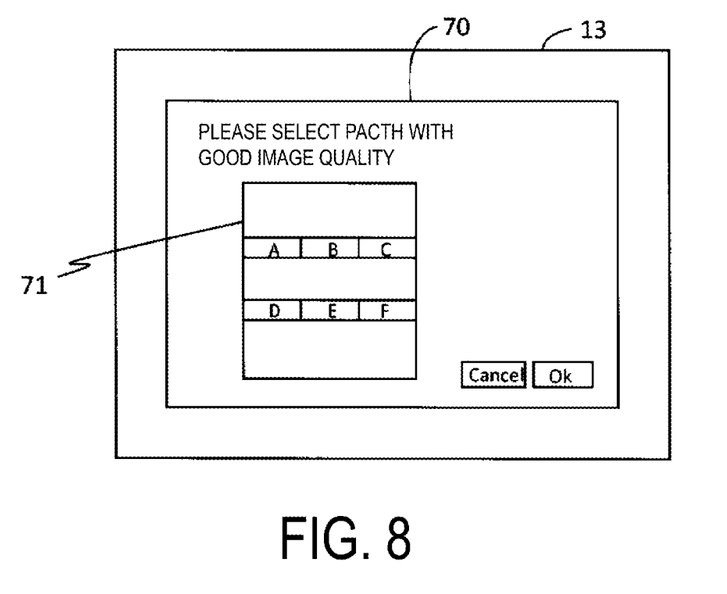
FIG. 8 is a diagram illustrating an example of a UI screen.

FIG. 8 illustrates an example of a user interface (UI) screen 70 for accepting the patch selection. After the test recording, the control unit 11 causes the display unit 13 to display the UI screen 70. The UI screen 70 displays a message explaining that the patch with a good image quality should be selected, and a test image 71. The test image 71 is an image represented by the recording data acquired at step S100, and is a result of the recording data 40 being drawn on the display unit 13, in accordance with the example illustrated in FIG. 4. Further, in the test image 71 of the UI screen 70, the control unit 11 may display a plurality of frames indicating regions corresponding to each of the patches, or may display symbols or character strings for identifying each of the patches, in order to make it easier for the user to recognize each of the patches.

In an example illustrated in FIG. 8, six frames indicating six of the patches, and symbols A, B, C, D, E, and F indicating the six patches are displayed in the test image 71. Referring to FIG. 8 together with FIG. 4, the patch A corresponds to the first patch 44a. Similarly, the patch B corresponds to the second patch 44b, the patch C corresponds to the third patch 44c, the patch D corresponds to the fourth patch 45a, the patch E corresponds to the fifth patch 45b, and the patch F corresponds to the sixth patch 45c.

The user visually recognizes the recording result of the test image on the recording medium 30 that is output by the recording device 10, selects the patch with the best image quality, and performs an operation for selecting the patch with the best image quality on the UI screen 70 via the operation accepting unit 14. As the operation for selecting the patch with the best image quality in the recording result, the user may, for example, click or touch the display of one of the patches in the test image 71 corresponding to the selected patch. The patch with the good image quality is a patch having small differences in the image quality, such as differences in the density between the patch and a non-patch region, namely, the non-OL region, or a misalignment of patterns. Note that, as long as the UI screen 70 is an UI screen for accepting the operation of the user for selecting a desired patch from the result of the test recording, the design of the UI screen 70 is not limited to an aspect illustrated in FIG. 8.

At step S150, the control unit 11 determines the recording conditions of the OL processing corresponding to the selected patch accepted at step S140, to be the recording conditions of the OL processing in the actual recording. Step S150 corresponds to a determination step. For example, at step S140, it is assumed that the control unit 11 has accepted a selection of the patch B in the test image 71 on the UI screen 70. In this case, the control unit 11 determines the recording conditions of the OL processing associated at step S110 with the patch B, that is, the second patch 44b, to be the recording conditions of the OL processing to be used in the actual recording, and stores the determined recording conditions. More specifically, if the dot size table 60A, the dot allocation mask 50D, and the first combination of the drive voltages are associated with the second patch 44b at step S110, the control unit 11 stores the use of the dot size table 60A, the dot allocation mask 50D, and the first combination of the drive voltages, as the recording conditions of the OL processing. Note that when the recording conditions of the OL processing determined based on the previous test recording are already stored, it is sufficient that the control unit 11 overwrite the stored recording conditions with the recording conditions of the OL processing determined based on the test recording performed most recently. In this way, the flowchart illustrated in FIG. 3 ends.

When performing the actual recording, namely, normal recording that is not the test recording in response to an instruction from the user, the control unit 11 performs the actual recording using the recording conditions of the OL processing stored at that time. In other words, by appropriately changing the halftone processing, the allocation of the dot data, and the drive voltages in accordance with the stored recording conditions of the OL processing, the OL processing is performed on the OL regions of the recording image to be recorded in the actual recording based on the recording data. As a result, the user can obtain a good recording result having no or substantially no image quality difference between the non-OL regions and the OL regions.

Note that the present exemplary embodiment may have a configuration in which the recording head 15 performs bidirectional recording combining the main scanning in the forward direction and the main scanning in the return direction, or may be configured to perform unidirectional recording by the main scanning in only one of the directions.

8. Conclusion

In this manner, according to the present exemplary embodiment, the recording condition determining method is a method executed by the recording device 10 performing the recording onto the recording medium 30 by the main scanning, in which while moving the recording head 15 provided with a plurality of nozzles 17 in the main scanning direction, dots of the liquid are ejected from the plurality of nozzles 17 onto the recording medium 30, and the sub scanning, in which the recording medium 30 is transported in the sub scanning direction intersecting the main scanning direction. The method includes the patch recording step of recording patches onto the recording medium by the overlap-processing in which the main scanning is performed on the partial region of the recording medium in an overlapping manner a plurality of times, the patch recording step including recording the patches at a plurality of different positions in the main scanning direction by the plurality of types of the overlap-processing under respectively different recording conditions. The method further includes the selection accepting step of accepting selection of the patch from among the plurality of recorded patches, and the determination step of determining, as the recording condition of the overlap-processing of the actual recording, the recording condition of the overlap-processing associated with the patch selected in the selection accepting step.

According to the above-described configuration, as a result of the patch recording step, the plurality of patches are recorded on the recording medium 30 while being aligned in the main scanning direction, using the plurality of types of the OL processing having the respectively different recording conditions. Accordingly, the user can easily compare the plurality of recorded patches to select the patch with a good image quality, and can cause the recording device 10 to determine the recording conditions of the appropriate OL processing to be employed in the actual recording. Further, an amount of the recording medium 30 consumed in order to test the plurality of types of the OL processing having the respectively different recording conditions can be reduced.

Further, according to the first example, in the patch recording step, the recording conditions of the OL processing for the patches are respectively caused to be different from one another by varying the mask that determines the allocation of the dots to the plurality of main scannings.

According to the above-described configuration, by using the different dot allocation mask for each of the patches in the OL region, the plurality of patches having the respectively different recording conditions of the OL processing can be recorded while being aligned in the main scanning direction.

Further, according to the second example, in the patch recording step, the recording conditions of the overlap-processing for the patches are respectively caused to be different from one another by varying the size of the dots and/or the ejection order of a plurality of types of the dots of mutually different sizes.

According to the above-described configuration, by varying the size of the dots or varying the ejection order of the plurality of types of the dots having the respectively different sizes for each of the patches in the OL region, the plurality of patches having the respectively different recording conditions of the OL processing can be recorded while being aligned in the main scanning direction.

Further, according to the third example, in the patch recording step, the recording conditions of the overlap-processing for the patches are respectively caused to be different by varying the drive voltage for causing the nozzle 17 to eject the dots. According to the above-described configuration, by varying the drive voltage for each of the patches in the OL region, the plurality of patches having the respectively different recording conditions of the OL processing can be recorded while being aligned in the main scanning direction.

The content of the recording image recorded by the actual recording is various, including photographic images, line drawings, painted pictures, and the like, and colors used may be relatively light or relatively dark. Then, due to such differences in the content of the recording image, the way to appropriately perform the OL processing also differs. From such a perspective, in one mode of the present exemplary embodiment, in the patch recording step, the patch is recorded based on the recording data specified for the actual recording.

According to the above-described configuration, in the patch recording step, since the patch is recorded based on the same recording data as the recording data used in the actual recording, the recording conditions of the appropriate OL processing to be employed in the actual recording can be determined in accordance with the patch selection by the user.

Fixation and penetration conditions of the ejected dots are different depending on a type and surface conditions of the recording medium 30. Due to the differences in the type and surface conditions of the recording medium 30, the way to appropriately perform the OL processing also differs. Here, the "surface conditions" refer to differences in or the presence/absence of a surface treatment, such the application of glue, performed in advance on the recording medium 30. From such a perspective, in one mode of the present exemplary embodiment, in the patch recording step, the patch is recorded on the recording medium 30 specified for the actual recording.

According to the above-described configuration, in the patch recording step, since the patch is recorded on the same recording medium 30 as the recording medium 30 used in the actual recording, the recording conditions of the appropriate OL processing to be employed in the actual recording can be determined in accordance with the patch selection by the user.

However, in the present exemplary embodiment, for reasons such as the recording medium 30 used in the actual recording being expensive, another of the recording medium 30 that is similar to the recording medium 30 used in the actual recording, in terms of the type and conditions, can be used for the test recording.

As can be understood from FIG. 4 and the like, the OL regions recorded by the OL processing are generated at the plurality of different positions in the sub scanning direction (transport direction) D3. Given such a situation and the processing at step S110, the patch recording step of the present exemplary embodiment can be considered as a step of recording the patches at the plurality of positions different from one another in the main scanning direction and at the plurality of positions different from one another in the sub scanning direction, using the plurality of types of the OL processing having the respectively different recording conditions. In other words, by arranging the plurality of patches recorded by the OL processing having the respectively different recording conditions in a two-dimensional manner, the consumption of the recording medium 30 can be reduced while enabling the user to select the patch with the good image quality from among the larger number of the patches.

The present exemplary embodiment does not only provide the recording condition determining method, but also provides a device that executes this method, a program (the firmware 12) that realizes this method in conjunction with hardware, and a memory that stores the program.

The recording device 10 performs the recording onto the recording medium 30 by the main scanning, in which while moving the recording head 15 provided with a plurality of nozzles 17 in the main scanning direction, the dots of the liquid are ejected from the plurality of nozzles 17 onto the recording medium 30, and the sub scanning, in which the recording medium 30 is a transported in the sub scanning direction intersecting the main scanning direction. The recording device 10 includes the control unit 11 that controls the main scanning and the sub scanning. The control unit 11, when the patches are recorded onto the recording medium by the overlap-processing in which the main scanning is performed on a partial region of the recording medium 30 in an overlapping manner a plurality of times, records the patches at the plurality of different positions in the main scanning direction by the plurality of types of the overlap-processing under the respectively different recording conditions. Further, the control unit 11 accepts selection of a patch from among the plurality of recorded patches, and determines, as the recording condition of the overlap-processing for the actual recording, the recording condition of the overlap-processing associated with the selected patch.

What is claimed is:

1. A recording condition determining method executed by a recording device performing recording onto a recording medium by a main scanning, in which while moving a recording head provided with a plurality of nozzles in a main scanning direction, dots of a liquid are ejected from the plurality of nozzles onto the recording medium, and a sub scanning, in which the recording medium is transported in a sub scanning direction intersecting the main scanning direction, the method comprising:
a patch recording step of recording patches in a test image onto the recording medium by an overlap-processing in which the main scanning is performed on a partial region of the recording medium in an overlapping manner a plurality of times, the patch recording step including recording the patches at a plurality of different positions in the main scanning direction by a plurality of types of the overlap-processing under respectively different recording conditions;

a non-overlap recording step of recording, onto the recording medium, image other than the patches in the test image, the non-overlap recording step including performing one main scanning on a region that is different from the partial region of the recording medium in the sub-scanning direction, to record the image other than the patches in the test image;

a selection accepting step of accepting selection of a patch from among a plurality of the recorded patches; and a determination step of determining, as the recording condition of the overlap-processing of an actual recording, the recording condition of the overlap-processing associated with the patch selected in the selection accepting step.

2. The recording condition determining method according to claim 1, wherein in the patch recording step, the recording conditions of the overlap-processing for the patches are respectively caused to be different from one another by varying a mask that determines allocation of the dots to a plurality of the main scannings.

3. The recording condition determining method according to claim 1, wherein in the patch recording step, the recording conditions of the overlap-processing for the patches are respectively caused to be different from one another by varying a size of the dots, and/or an ejection order of a plurality of types of the dots of mutually different sizes.

4. The recording condition determining method according to claim 1, wherein in the patch recording step, the recording conditions of the overlap-processing for the patches are respectively caused to be different by varying a drive voltage for ejecting the dots from the nozzle.

5. The recording condition determining method according to claim 1, wherein in the patch recording step, the patch is recorded based on recording data specified for the actual recording.

6. The recording condition determining method according to claim 1, wherein in the patch recording step, the patch is recorded onto the recording medium specified for the actual recording.

7. A recording device performing recording onto a recording medium by a main scanning, in which while moving a recording head provided with a plurality of nozzles in a main scanning direction, dots of a liquid are ejected from the plurality of nozzles onto the recording medium, and a sub scanning, in which the recording medium is transported in a sub scanning direction intersecting the main scanning direction, the device comprising:

a control unit configured to control the main scanning and the sub scanning, wherein the control unit, when patches in a test image are recorded onto the recording medium by overlap-processing in which the main scanning is performed on a partial region of the recording medium in an overlapping manner a plurality of times, records the patches at a plurality of different positions in the main scanning direction by a plurality of types of the overlap-processing under respectively different recording conditions, the control unit records, onto the recording medium, image other than the patches in the test image by a non-overlap recording processing in which one main scanning is performed on a region that is different from the partial region of the recording medium in the sub-scanning direction, the control unit accepts selection of a patch from among a plurality of the recorded patches, and the control unit determines, as the recording condition of the overlap-processing for an actual recording, the recording condition of the overlap-conditions associated with the selected patch.

* * * * *